United States Patent
Jain et al.

(10) Patent No.: US 11,205,207 B2
(45) Date of Patent: Dec. 21, 2021

(54) AUTOMATED DIGITAL CATALOG GENERATION

(71) Applicant: Adobe Inc., San Jose, CA (US)

(72) Inventors: Sanyam Jain, New Delhi (IN); Ramnik Singh, Noida (IN); Pragya Kandari, Srinagar Garhwal (IN); Gaurav Bhargava, Noida (IN); Anshul Jain, Lalitpur (IN); Abhinav Agarwal, Noida (IN)

(73) Assignee: Adobe Inc., San Jose, CA (US)

(*) Notice: Subject to any disclaimer, the term of this patent is extended or adjusted under 35 U.S.C. 154(b) by 69 days.

(21) Appl. No.: 15/976,646

(22) Filed: May 10, 2018

(65) Prior Publication Data
US 2019/0303984 A1    Oct. 3, 2019

(30) Foreign Application Priority Data
Mar. 29, 2018 (IN) .............................. 201811011966

(51) Int. Cl.
| G06Q 30/06 | (2012.01) |
| G06F 40/106 | (2020.01) |
| G06F 40/134 | (2020.01) |
| G06F 40/143 | (2020.01) |

(52) U.S. Cl.
CPC ....... *G06Q 30/0603* (2013.01); *G06F 40/106* (2020.01); *G06F 40/134* (2020.01); *G06F 40/143* (2020.01)

(58) Field of Classification Search
CPC .............. G06F 17/2235; G06F 17/212; G06Q 30/0603
See application file for complete search history.

(56) References Cited

U.S. PATENT DOCUMENTS

| 7,013,290 | B2* | 3/2006 | Ananian | G06Q 30/02 705/26.42 |
| 7,035,817 | B1* | 4/2006 | Brothers | G06Q 20/12 705/27.1 |
| 7,707,508 | B1* | 4/2010 | Moskalonek | G06T 11/60 715/762 |
| 8,660,912 | B1* | 2/2014 | Dandekar | G06Q 30/02 705/27.1 |
| 9,959,257 | B2* | 5/2018 | Sasikumar | G06F 40/279 |
| 9,984,053 | B2* | 5/2018 | Waterfall | G06F 17/214 |
| 10,210,554 | B2* | 2/2019 | Linevsky | G06Q 30/0643 |
| 10,248,991 | B1* | 4/2019 | Cheung | G06Q 30/0643 |

(Continued)

*Primary Examiner* — Maikhanh Nguyen
(74) *Attorney, Agent, or Firm* — FIG. 1 Patents

(57) ABSTRACT

As part of generating a digital catalog, a creative professional interacts with digital content via a user interface to specify an arrangement of the digital content in relation to each other. This is used by a digital layout creation system to generate a layout block that is to serve as a basis for digital catalog entries in the digital catalog. As part of arranging the digital content, the digital layout creation system generates metadata automatically and without user intervention in real time that specifies the arrangement of the digital content and what digital content is associated as part of that arrangement. Once a desired arrangement is achieved by the creative professional, an input is received by the digital layout creation system to create a layout block that is used as a basis to generate digital catalog entries of a digital catalog.

19 Claims, 17 Drawing Sheets

(56) References Cited

U.S. PATENT DOCUMENTS

| | | | |
|---|---|---|---|
| 10,529,010 B2* | 1/2020 | Hendlin | G06Q 30/0621 |
| 10,691,875 B2* | 6/2020 | Sasikumar | G06F 40/221 |
| 2003/0028451 A1* | 2/2003 | Ananian | G06Q 30/02 |
| | | | 705/26.42 |
| 2011/0314036 A1* | 12/2011 | Cunningham | G06Q 30/02 |
| | | | 707/756 |
| 2013/0262228 A1* | 10/2013 | Gershon | G06Q 30/0255 |
| | | | 705/14.53 |
| 2016/0012499 A1* | 1/2016 | Linevsky | G06Q 30/0603 |
| | | | 705/27.1 |
| 2016/0170941 A1* | 6/2016 | Waterfall | G06F 17/2264 |
| | | | 715/235 |
| 2017/0371624 A1* | 12/2017 | Cheung | G06F 9/451 |
| 2018/0053244 A1* | 2/2018 | Hendlin | G06Q 30/0621 |
| 2018/0217965 A1* | 8/2018 | Sasikumar | G06F 40/279 |

* cited by examiner

AUTOMATED DIGITAL CATALOG GENERATION

RELATED APPLICATION

This application claims priority under 35 USC 119 or 365 to India Application No. 201811011966 filed Mar. 29, 2018, the disclosure of which is incorporated by reference in its entirety.

BACKGROUND

Digital layout creation systems are typically employed to create layouts and designs for digital content to achieve a desired output in how the digital content is arranged with respect to each other. To do so using conventional techniques, creative professionals interact with a user interface of the digital layout creation system, with precision, to manually specify the locations of the digital content. While these conventional techniques have performed well to produce a result having a limited number of items of digital content, these techniques may fail when confronted with a multitude of digital content, such as can be observed in a digital catalog.

A digital catalog may be configured to support hundreds, thousands, and even millions of digital catalog entries, each of which may include multiple items of digital content. A digital catalog, for instance, may be used to represent hundreds of articles available via a digital content publisher, thousands of vehicles available from a retail seller, millions of parts available from a warehouse system, and so forth. Each of these digital catalog entries may include multiple items of digital content, e.g., a titles, descriptive text, prices, digital images, illustrations, and so forth. Accordingly, inefficiencies and challenges of conventional digital layout creation systems are exacerbated when used to create a digital catalog.

In one such conventional example, a creative professional creates a layout by manually drawing empty boxes within a page in a user interface. The creative professional then also manually links each of the empty boxes to a XML document using tags. The tags are then used to import digital content to create the digital catalog entry. This process was then repeated to import digital content, individually, for each box of each digital catalog entry. Thus, this conventional technique faces numerous challenges. The first such challenge is that the creative professional creates the layout using empty boxes, and thus lacks richness and accuracy. The creative professional, for instance, is forced to make a best guess in visualizing how the digital content might look within these empty boxes.

Additionally, the manual linking of items of digital content to the boxes using XML is simply not feasible for digital catalogs that may have the multitude of items as previously described, e.g., over thousands of different digital catalog items. Further, this also required creative professionals to have specialized knowledge regarding configuration and use of XML, which may be frustrating to creative professionals that are relied upon mainly for their creative expertise and not their coding experience.

Yet further, these conventional techniques are typically specified "per page." For example, conventional techniques specify a layout for an entirety of a particular page size and orientation. This limits usefulness of these layouts to devices that support display of that page size and orientation, i.e., to particular types of devices such as desktop devices versus mobile devices and so forth. Accordingly, conventional techniques result in operational inefficiency of computing devices and user inefficiency in interacting with these techniques in order to generate a digital catalog.

SUMMARY

Digital catalog creation systems and techniques are described that overcome the challenges of conventional techniques to generate a digital catalog with increased computational efficiency and well as increased user efficiency in interacting with a computing device that incorporates these techniques. In one example, a creative professional first interacts with digital content via a user interface to specify an arrangement of the digital content in relation to each other. This is used by the digital layout creation system to generate a layout block that is to serve as a basis for digital catalog entries in the digital catalog.

As part of arranging the digital content, the digital layout creation system generates metadata automatically and without user intervention in real time that specifies the arrangement of the digital content and what digital content is associated as part of that arrangement. This may be performed in a variety of ways, an example of which includes use of a markup language such as XML.

Once a desired arrangement is achieved by the creative professional, an input is received by the digital layout creation system to create a layout block. The digital layout creation system uses the metadata that describes arrangement of the digital content, links to the digital content, and tags describing the digital content to create the layout block. The layout block may thus be configured to include respective frames for each of the items of digital content included in the arrangement. The layout block is then used as a template for digital catalog entries in the digital catalog, which may be used to support multiple entries on a single page and support automatic creation of multiple pages.

Inputs, for instance, are received by the digital layout creation system from a creative professional to specify digital content sources to be used to fill each of the frames of the layout block. Once selected, the digital layout creation system is configured to generate the digital catalog entries automatically and without user intervention. The digital layout creation system, for instance, may replace links to digital content and metadata within the layout block with links and metadata from respective digital content sources. This is performed automatically such that multiple digital catalog entries may be included in a single page that, once capacity is reached, a new page is added automatically and without user intervention. In this way, a digital catalog may be created having a multitude of digital catalog entries, which is not possible using conventional techniques.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
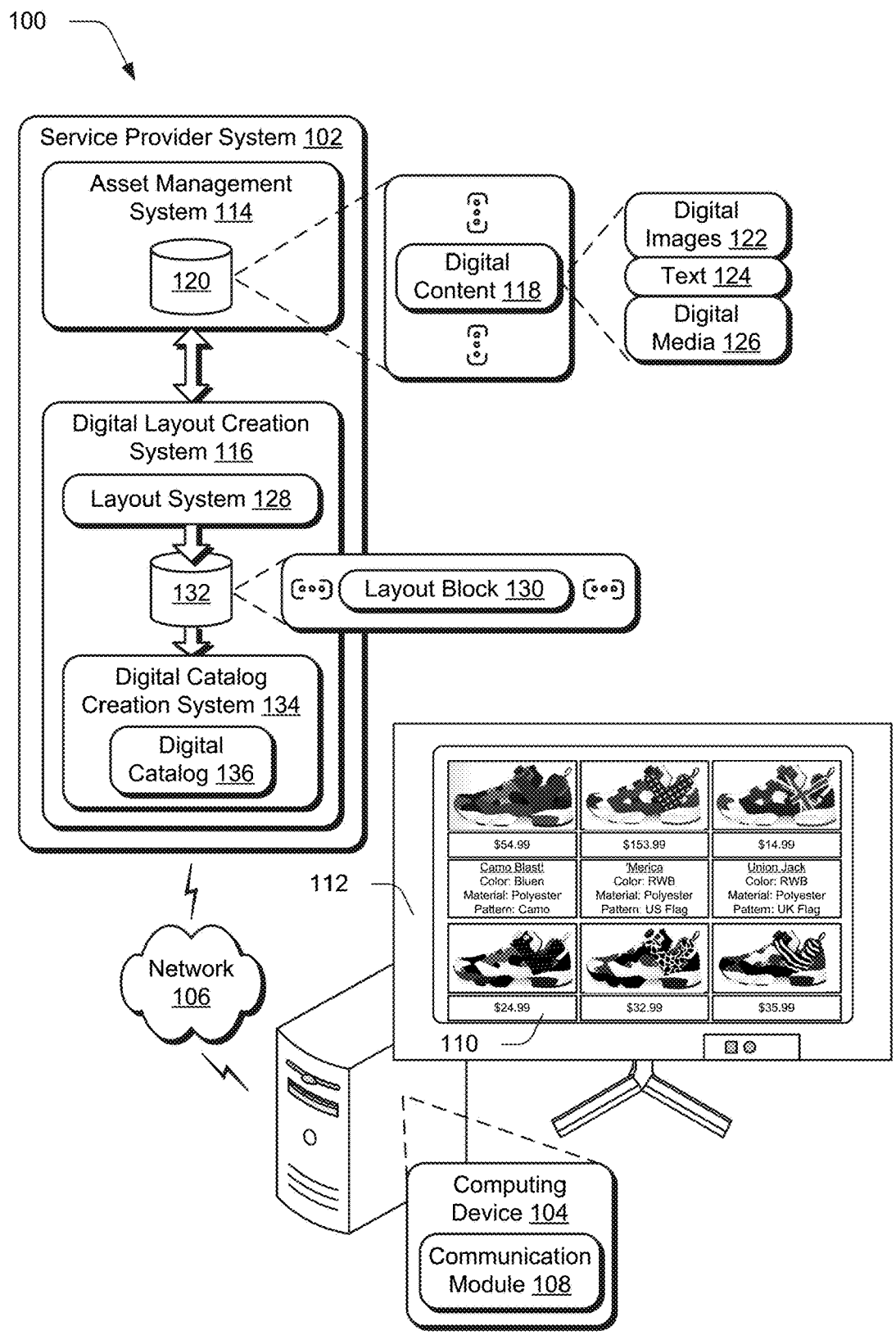
FIG. 1 is an illustration of an environment in an example implementation that is operable to employ digital catalog and layout block techniques described herein.

Digital catalog creation systems and techniques are described that overcome the challenges of conventional techniques to generate a digital catalog. These techniques and systems support increased computational efficiency of a computing device and well as increased user efficiency in interacting with the computing device that incorporates these techniques. As a result, these techniques and systems may address digital catalogs having a multitude of digital catalog entries (e.g., hundreds, thousands, and even millions of entries) that was not possible using conventional techniques, due to both user and computational inefficiencies. Further, these techniques and systems are made accessible to creative professionals that do not have specialized coding knowledge, which also was not possible using conventional techniques.

Digital catalogs are configured in the following to include digital catalog entries. These digital catalog entries may relate to a variety of different items, which may or may not be made available for sale. The digital catalog entries, for instance, may describe articles, parts, books, movies, class assignments, and so forth. The digital catalogs may then also be output in a variety of ways, such as made available via a website, rendered into a printable version, included in an email, and so forth.

In order to generate a digital catalog, a creative professional in one example first interacts with digital content via a user interface to specify an arrangement of the digital content in relation to each other. The creative professional, for instance, may select digital content from an asset management system which may include digital images, text, digital media including logos, illustrations, vector drawings, and so forth. The creative professional may then arrange the digital content within the user interface as desired.

This is used by the digital layout creation system to generate a layout block that is to serve as a basis for digital catalog entries in the digital catalog. In this way, the creative professional is able to interact with actual digital content, as opposed to empty boxes as in conventional techniques, and as such increases the creative professional's accuracy in creating the layout block.

The creative professional, for instance, may interact with the digital content to specify a title of a digital catalog entry, a digital image of the digital catalog entry, and a textual description of the digital catalog entry. As part of arranging the digital content, the digital layout creation system generates metadata automatically and without user intervention in real time that specifies the arrangement of the digital content and what digital content is associated as part of that arrangement. This may be performed in a variety of ways, an example of which includes use of a markup language such as XML. The digital layout creation system, for instance, may track location of the digital content in the user interface (e.g., x/y coordinates) as well as descriptive data associated with the digital content (e.g., metadata from an asset management system such as type of digital content) to generate this metadata in real time as the digital content is moved, resized, added to, and removed from the user interface. In this way, a creative professional may interact with the digital layout creation system without the specialized coding knowledge as required in conventional techniques. Even for creative professionals that have such specialized coding knowledge, this increases the efficiency of user interaction with the computing device and thus operational efficiency of the computing device as a whole.

Once a desired arrangement is achieved by the creative professional, an input is received by the digital layout creation system to create a layout block. The digital layout creation system, for instance, may use the metadata that describes arrangement of the digital content, links to the digital content, and tags describing the digital content to create the layout block. The layout block, for instance, may be configured to include respective frames for each of the items of digital content included in the arrangement. The layout block is then used as a template for digital catalog entries in the digital catalog, which may be used to support multiple entries on a single page and support automatic creation of multiple pages. This is not possible using conventional page-based layout techniques in which an entirety of a page is created as a basis for the layout.

The layout block, for instance, may be uploaded to an asset management system for inclusion with a plurality of other layout blocks in a repository, e.g., storage device system. The creative professional (or another creative professional) may then choose this layout block from the repository to be used as a basis to generate the digital catalog entries in the digital catalog.

After selection of the layout block, inputs are received by the digital layout creation system from the creative professional to specify digital content sources to be used to fill each of the frames of the layout block. The digital content sources, for instance, may include repositories of digital content that are local to the computing device, available remotely (e.g., from an asset management system), and so forth. The inputs, for instance, may select digital content sources in an order that matches a defined order for frames in the layout block, e.g., title, digital image, descriptive text, and so forth.

Once selected, the digital layout creation system is configured to generate the digital catalog entries automatically and without user intervention. The digital layout creation system, for instance, may replace links to digital content and metadata within the layout block with links and metadata from respective digital content sources. This is performed automatically such that multiple digital catalog entries may be included in a single page that, once capacity is reached, a new page is added automatically and without user intervention. Both of these advantages are not possible using conventional page-based layout techniques in which an entirety of the page was configured as a layout. Further, this also supports views having multiple sizes and orientations, which also support use on multiple types of computing devices that also was not possible using conventional techniques. In this way, a digital catalog may be created having a multitude of digital catalog entries, further discussion of which is included in the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. The illustrated environment 100 includes a service provider system 102 and a computing device 104 that are communicatively coupled, one to another, via a network 106. A variety of computing device configurations may be used to implement the service provider system 102 and/or computing device 104.

A computing device, for instance, may be configured as a desktop computer, a laptop computer, a mobile device (e.g., assuming a handheld configuration such as a tablet or mobile phone as illustrated), and so forth. Thus, a computing device may range from full resource devices with substantial memory and processor resources (e.g., personal computers, game consoles) to a low-resource device with limited memory and/or processing resources (e.g., mobile devices). Additionally, although a single computing device is shown, a computing device may be representative of a plurality of different devices, such as multiple servers utilized by a business to perform operations "over the cloud" as described in FIG. 18, such as for the service provider system 102.

The computing device 104 is illustrated as including a communication module 108 that is configured to communicate and support interaction with the service provider system 102. The communication module 108, for instance, may be configured as a web browser, a network-enable application, and so on. Although functionality to generate a digital catalog system is described in the following as implemented by the service provider system 102, this functionality may be implemented partially or as a whole by the computing device 104, e.g., through local execution by a processing system and computer-readable storage media. The computing device 104 is also illustrated as including a user interface 110 as rendered by a display device 112 that supports user interaction, e.g., through use of a cursor control device, spoken utterances, touchscreen functionality, through use of a natural user interface, and so forth.

The service provider system 102 is illustrated as including an asset management system 114 and a digital layout creation system 116. The asset management system 114 is representative of functionality to maintain, manage, and distribute digital content 118, which is illustrated as stored by a storage device 120. Digital content 118 may take a variety of forms, such as digital images 122, text 124, digital media 126 (e.g., vector graphics, illustrations, digital videos, digital audio), and so forth. Although illustrated separately from the digital layout creation system 116, this functionality may also be incorporated as part of that system. Further, the asset management system 114 may be representative of one of a plurality of different digital content sources that are usable to form a digital catalog, and thus may also be implemented by the computing device 104, itself.

The digital layout creation system 116 includes a layout system 128 that is configured to generate, maintain, and use one or more layout blocks 130, an example of which is illustrated as stored by a storage device 132. The layout blocks 130 are used by the layout system 128 to specify a layout of digital content 118 within individual digital catalog entries. The layout blocks 130 may then be used by the digital catalog creation system 134 as a basis to arrange the digital catalog entries on a page such that multiple entries may be included on a single page. This is not possible using conventional page based techniques in which a layout describes a page as a whole.

Additionally, automatic pagination techniques may also be utilized by the digital catalog creation system 134 to add additional "new" pages once a capacity of a current page of the digital catalog 136 is reached, which again is not possible with conventional techniques that are limited to single pages. Further, the layout system 128 supports techniques in which the layout block 130 is based on user interaction and arrangement with actual digital content 118, as opposed to empty boxes as performed in conventional techniques. As a result of these advantages, the digital layout creation system 116 supports increased accuracy and rich interaction to generate a layout block 130, with automated metadata generation, which may then be used to generate thousands and millions of digital catalog entries within a digital catalog 136. Further discussion of these and other examples is included in the following sections and is shown in corresponding figures.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Layout Block Generation by the Digital Layout Creation System

Figure 2:
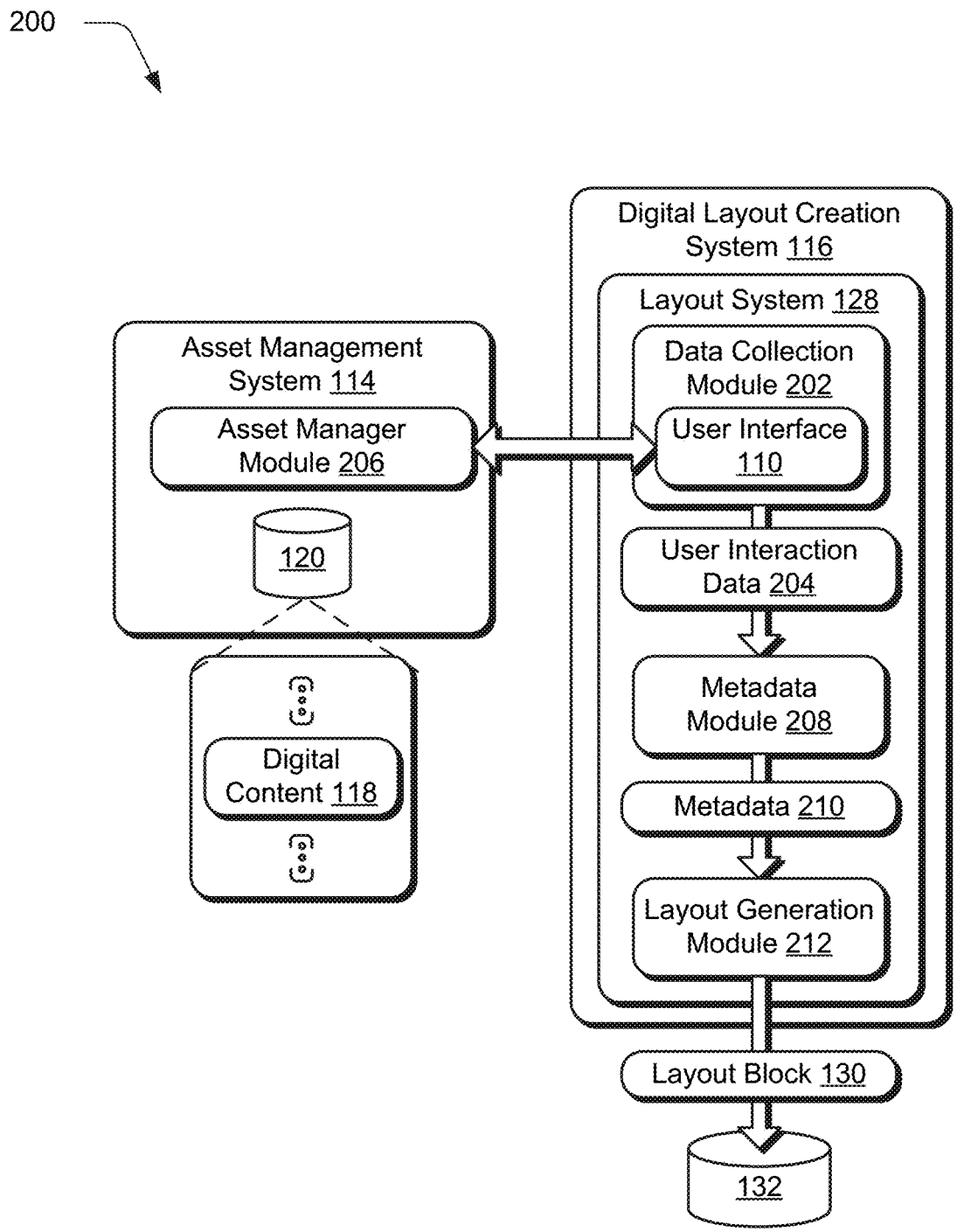
FIG. 2 depicts a system in an example implementation showing operation of a layout system of FIG. 1 in greater detail as being used to generate a layout block.
Figure 3:
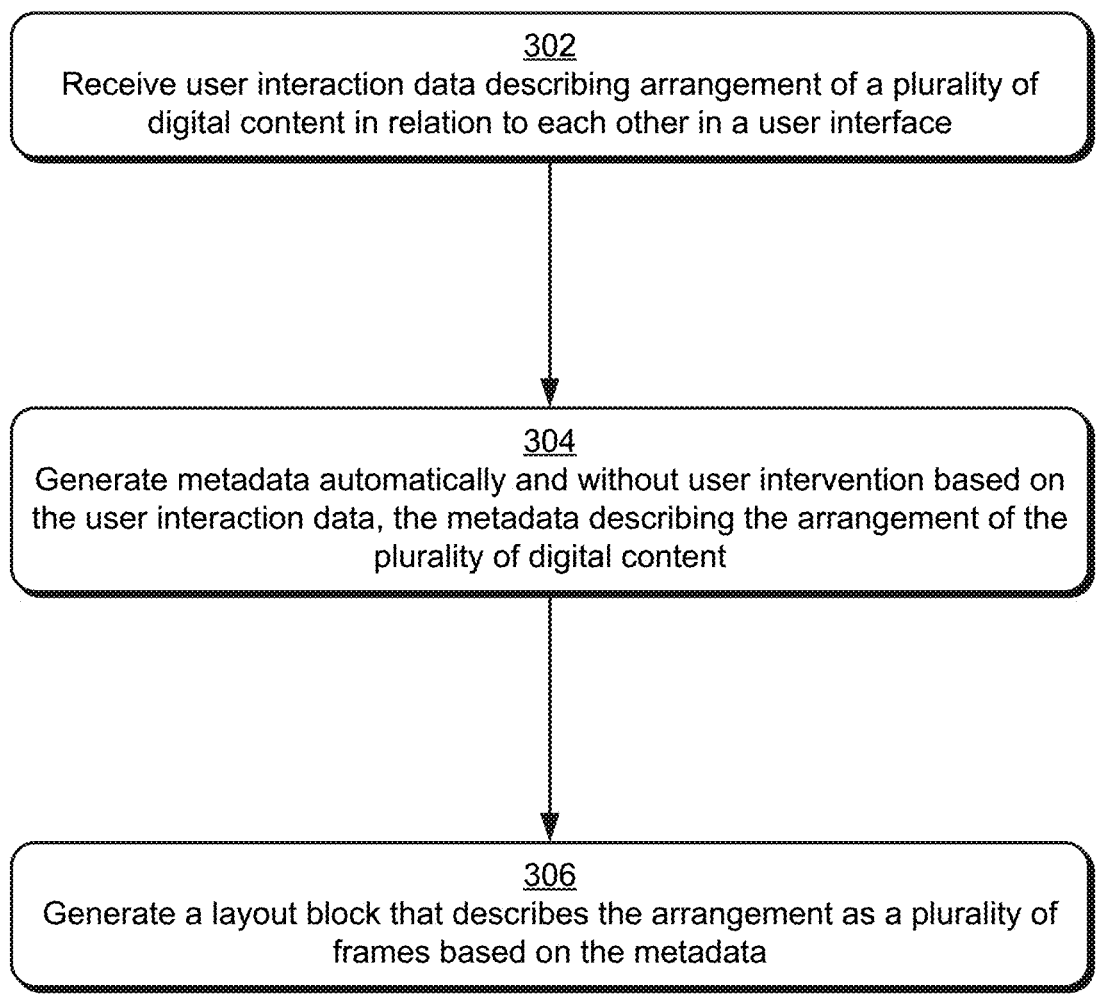
FIG. 3 is a flow diagram depicting a procedure in an example implementation in which arrangement of digital content is used to generate metadata automatically and without user intervention that is then used as a basis to generate a layout block.

FIG. 2 depicts a system 200 in an example implementation showing operation of the layout system 128 of FIG. 1 in greater detail as being used to generate a layout block 130. FIG. 3 depicts a procedure 300 in an example implementation in which arrangement of digital content is used to generate metadata automatically and without user intervention that is then used as a basis to generate a layout block.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 1-3 as well as the user interfaces and systems of FIGS. 4-11, interchangeably.

To begin, a creative professional interacts with the layout system 128 to obtain and arrange digital content 118 that is used as a basis to generate user interaction data 204. The layout system 128, for instance, may include a data collection module 202 having a user interface 110 that is configured to interact with an asset management system 114, an example of which is Adobe Experience Manager®. The asset management system 114 includes digital content 118, which may take a variety of forms, such as digital images, illustrations, digital video, digital audio, and so on as previously described.

Figure 4:
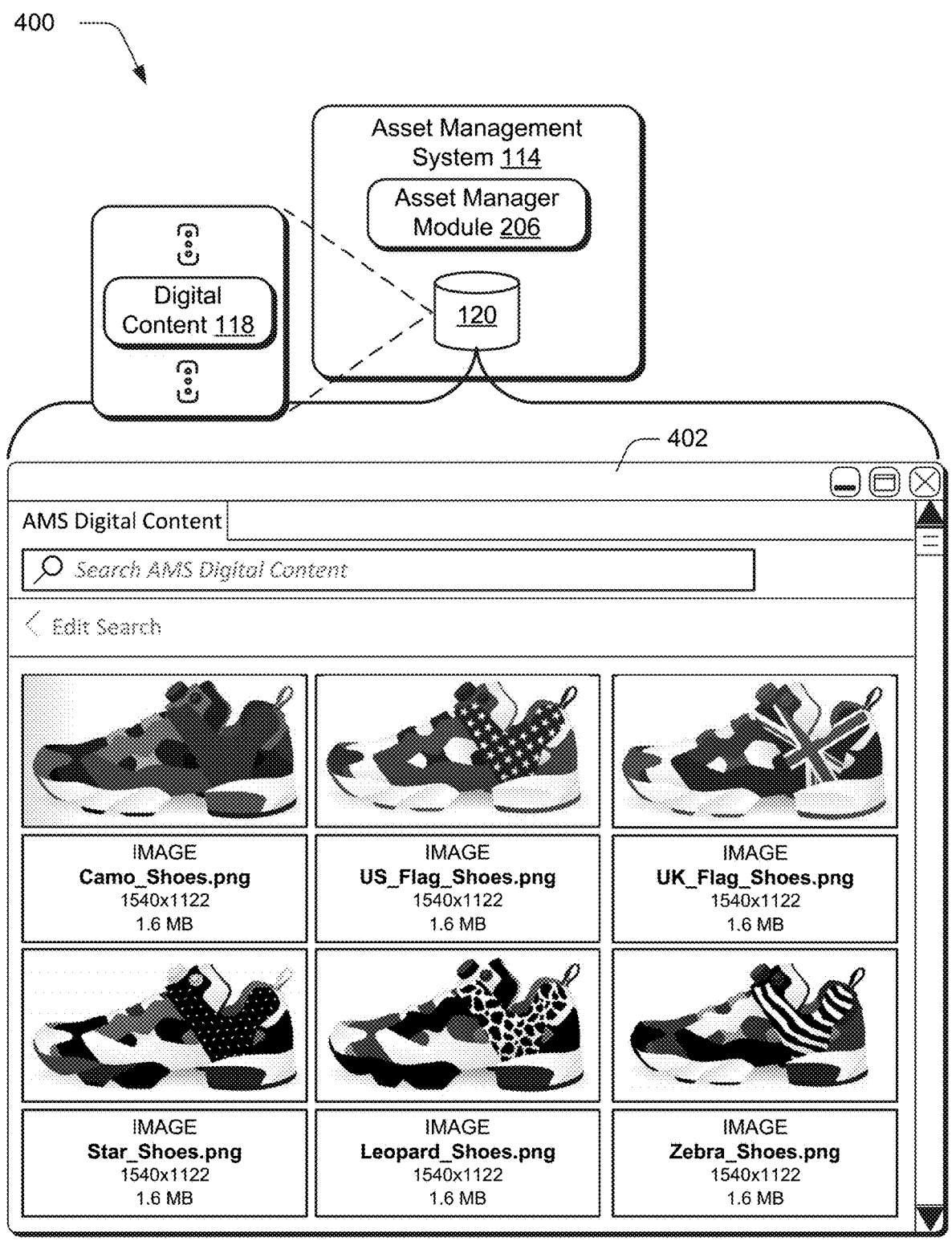
FIG. 4 depicts an example system showing examples of items of digital content of an asset management system

FIG. 4 depicts an example system 400 showing examples of items of digital content 118 (also referred to as "assets" in the following) of an asset management system 114, which in this instance are digital images of shoes in a user interface 402. The digital images in this example form a collection, which is used to describe a grouping of multiple assets into a hierarchical structure, e.g., folders. The digital content 118 of the asset management system 114 may include metadata that describes the digital content, such as title, type, size, author, and so forth. In one example, the asset management system 114 also permits metadata to be specified for the collection as a whole, e.g., identify a creative professional that formed the collection, common characteristics of digital content included in the collection, and so forth.

Figure 5:
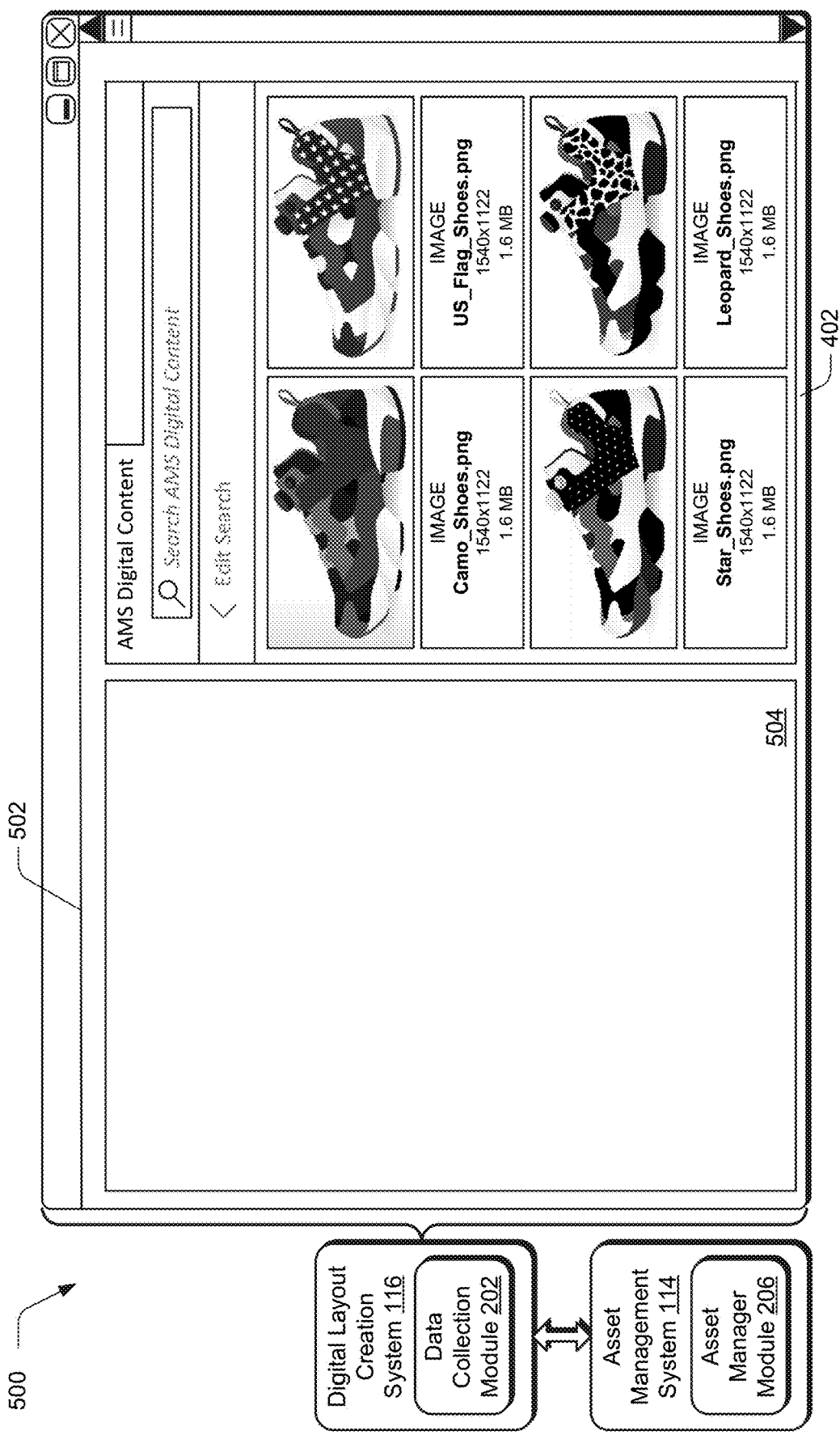
FIG. 5 depicts an example of access of the user interface of the asset management system within a user interface of the digital layout creation system.

FIG. 5 depicts an example 500 of access of the user interface 402 of the asset management system 114 within a user interface 502 of the digital layout creation system 116. In this example, the user interface 402 of the asset management system 114 is displayed non-modally as a pane within a user interface 502 of the digital layout creation system 116, thereby improving efficiency of user navigation and interaction. The user interface 502 also includes a layout pane 504, in which, digital content may be placed and arranged as a basis to form the layout block 130.

Figure 6:
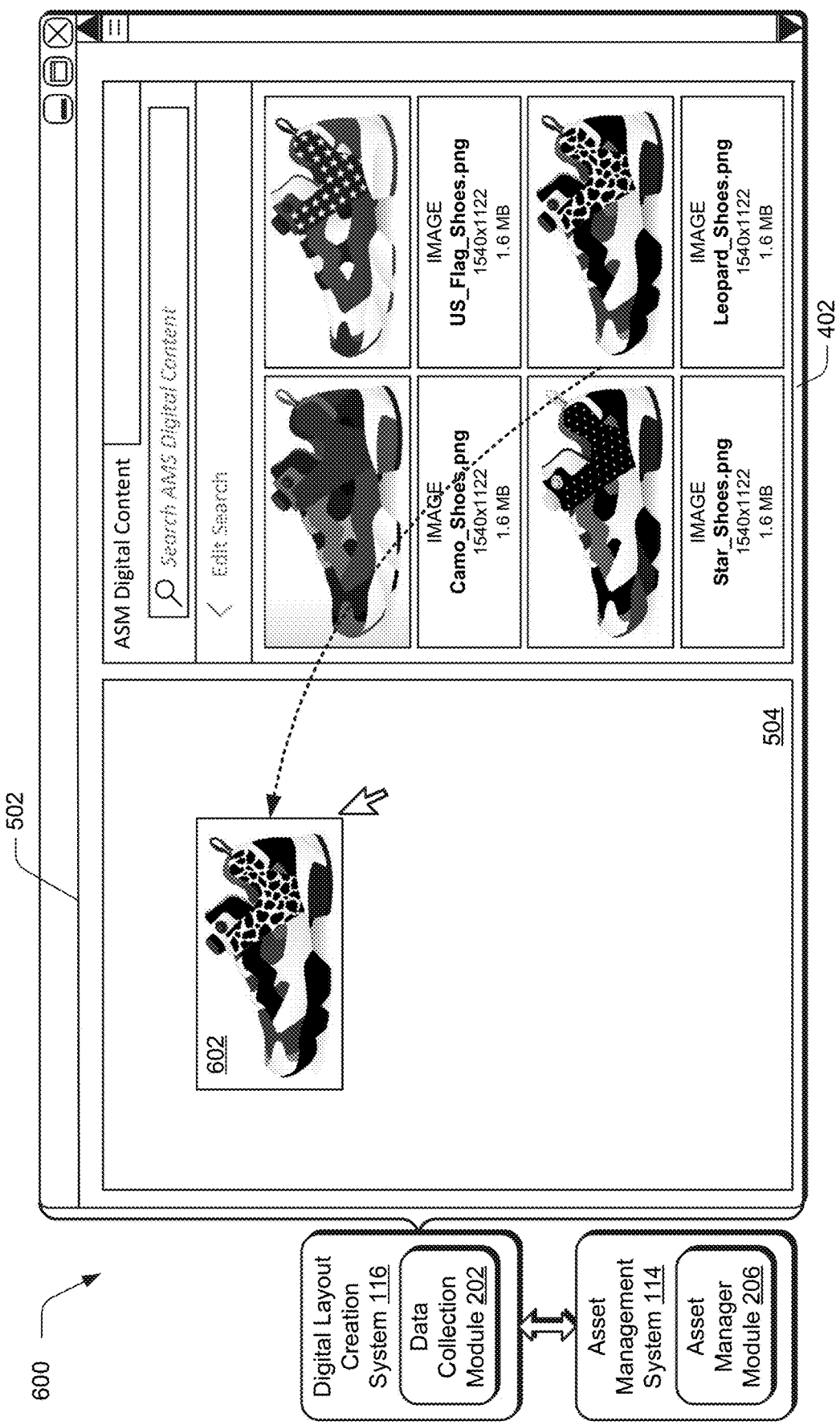
FIG. 6 depicts an example of selection of an item of digital content from the asset management system that is to be used as a basis to generate the layout block.

FIG. 6 depicts an example 600 of selection of an item of digital content 602 from the asset management system 114 that is to be used as a basis to generate the layout block 130. As illustrated, a drag-and-drop operation is performed in which an item of digital content 602 from the asset management system 114 is dragged to the layout pane 504 of the user interface 502 of the digital layout creation system 116.

This causes the digital layout creation system 116, and more particularly the data collection module 202, to create a link (e.g., a URL based link). This is used to reduce a file size through use of a low-resolution version of the item of digital content 602 while keeping an association with the actual item of digital content 602 as available from the asset management system 114. Thus, this improves network and computational resource efficiency by not requiring transmission via the network 106 nor local storage of the digital content 602 locally on the computing device 104.

Figure 7:
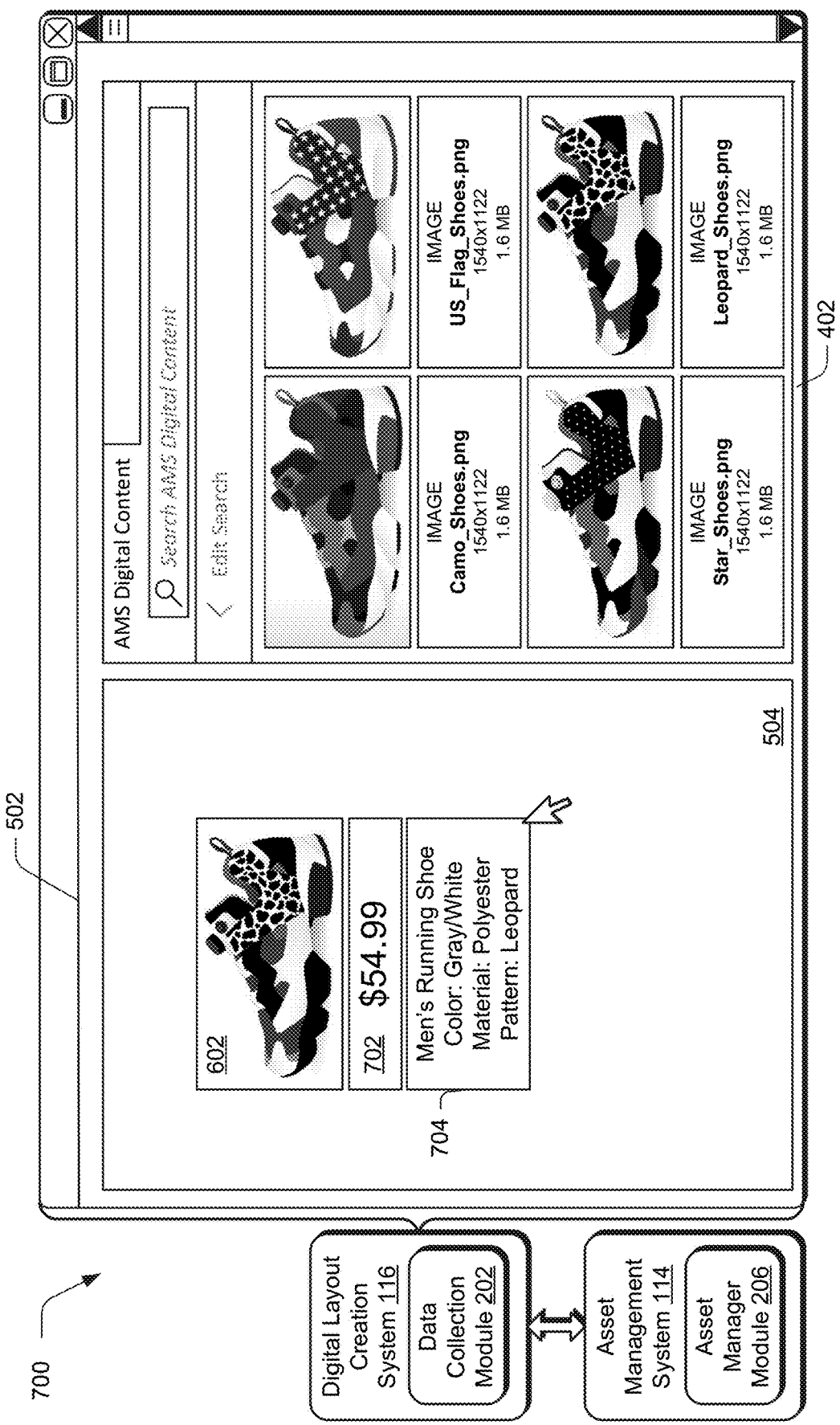
FIG. 7 depicts an example of continuation of a process of FIG. 6 to add and arrange digital content in relation to each other.

FIG. 7 depicts an example 700 of continuation of this process to add and arrange digital content in relation to each other. In this example, a first block of digital text 702 is used to specify a price of a good or service that is subject of the digital catalog entry of the digital catalog 136. User inputs, for instance, may be received to first specify an area within the layout pane 504 of the user interface 502 that is to receive the text (e.g., a bounding box), and then receive inputs specifying a font, size, and text for inclusion in that area. This may also be performed for a second block of digital text 704 that is used to describe characteristics of the good or service (e.g., shoe) that is subject of the digital catalog entry of the digital catalog 136.

Figure 8:
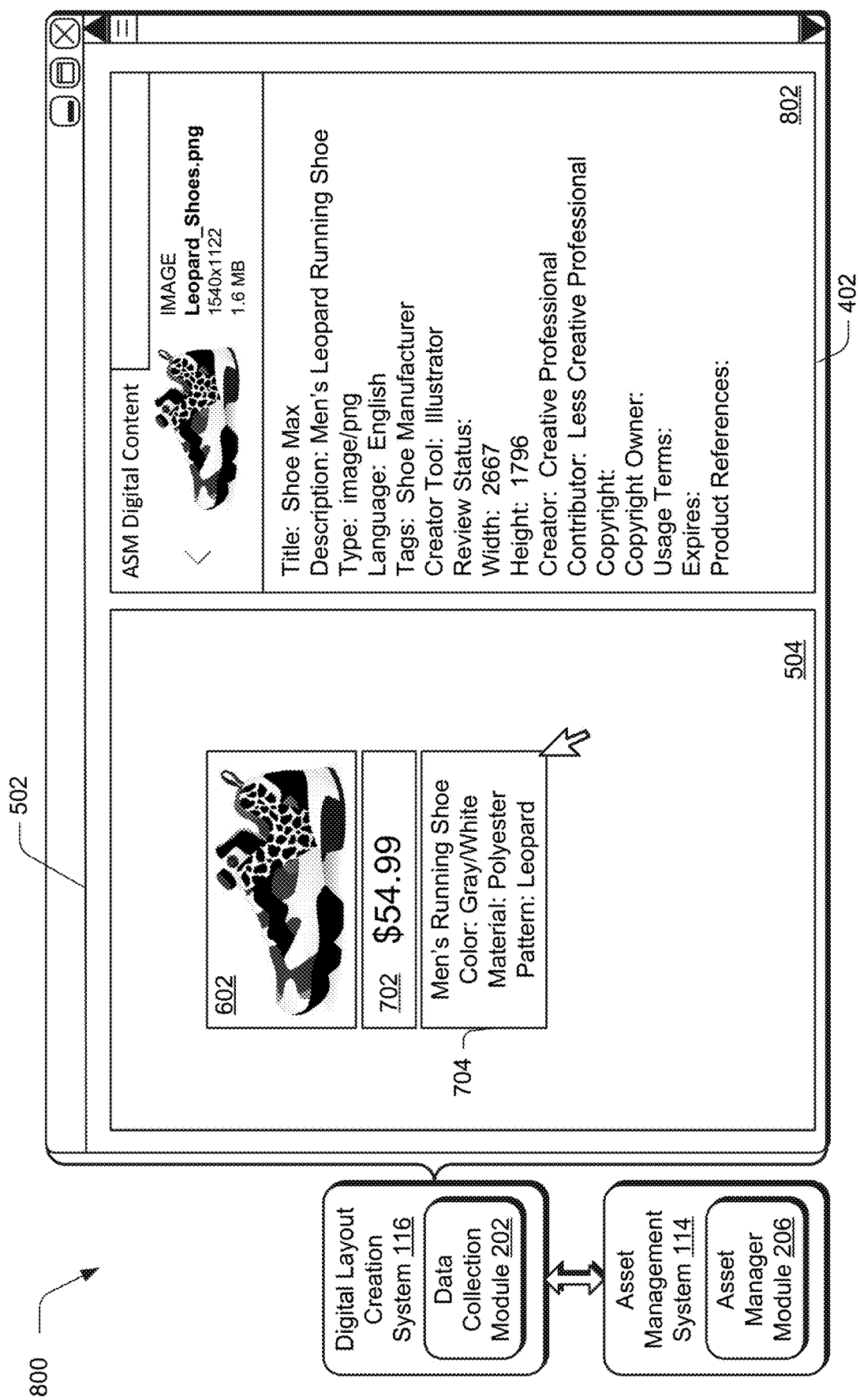
FIG. 8 depicts an example of output of metadata associated with items of digital content as obtained from the asset management system.

FIG. 8 depicts an example 800 of output of metadata associated with the items of digital content 602 as obtained from the asset management system 114. A creative professional, for instance, may select the item of digital content 602, e.g., by "right clicking" on the item. In response, the data collection module 202 obtains metadata from the asset management system 114, which is displayed in a metadata pane 802 in the user interface 502. The metadata pane 802, for instance, may include a title, description, type of digital content, language, tags, creator tool (e.g., application) used to create the digital content, review status, width and height, creator, contributor, copyright information and usage terms, product references, and so forth.

Returning again to FIG. 2, as the user interaction occurs to select digital content and arrange the digital content in relation to each other, user interaction data is generated by the data collection module 202 describing arrangement of a plurality of digital content in relation to each other in a user interface (block 302). This user interaction data 204 is then employed by a metadata module 208 to generate metadata 210 automatically and without user intervention based on the user interaction data 204. The metadata 210 describes the arrangement of the plurality of digital content (block 304), may include links to items of digital content, and may also specify frames, within which, individual items of the digital content are disposed in the layout pane 504.

Figure 9:
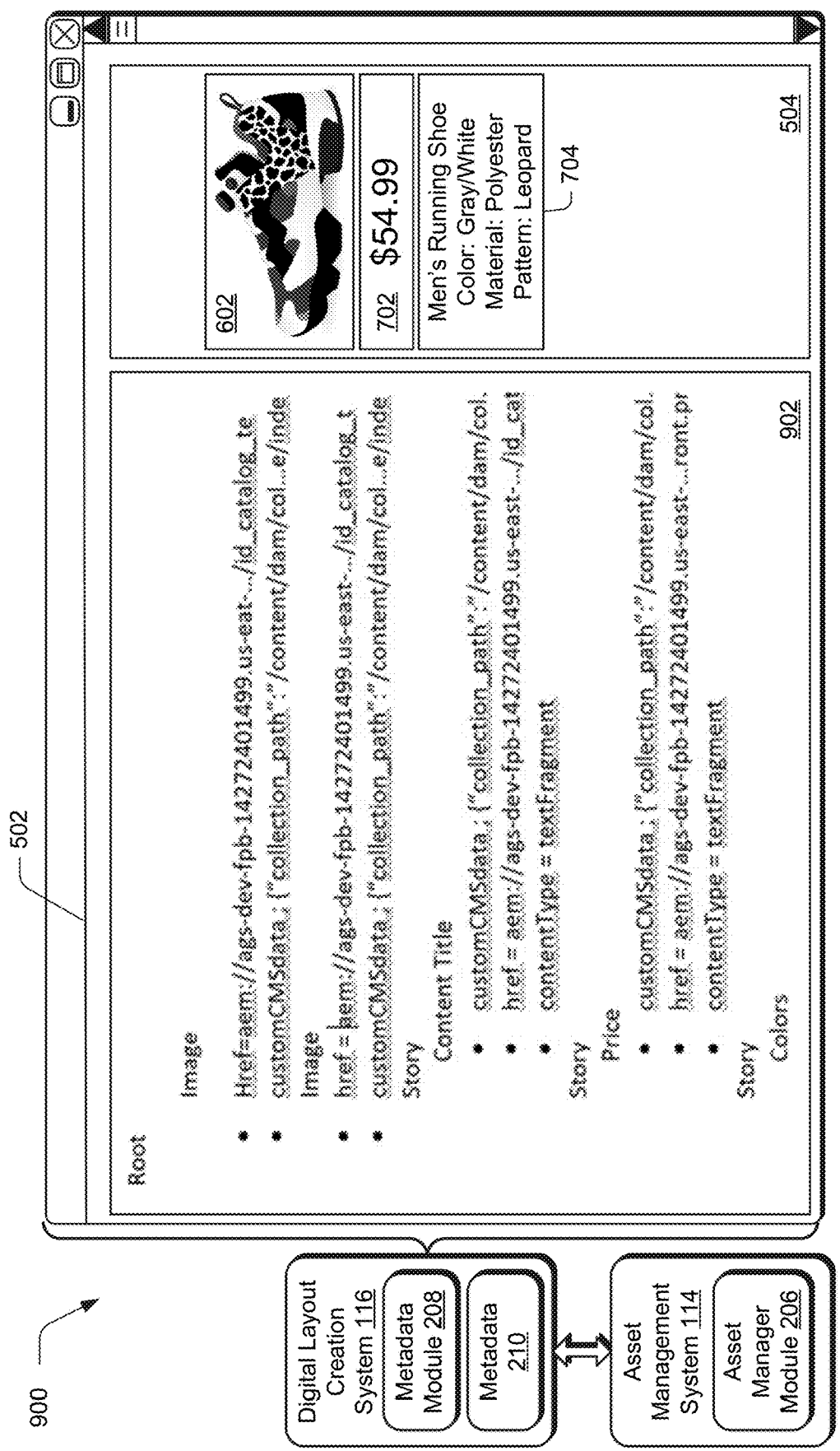
FIG. 9 depicts an example of automated generation of metadata by a metadata module.

FIG. 9 depicts an example of automated generation of metadata 210 by a metadata module 208. Examples of metadata 210 are illustrated as disposed in a metadata pane 902 in the user interface 502 concurrently with the layout pane 504. The metadata 210 is configured according to a markup language in this example, e.g., an extensible markup language (XML). The metadata module 208 generates the metadata 210 automatically and without user intervention in real time to reflect an arrangement of the digital content in the layout pane 504 in relation to each other, links to the digital content, collection information, as well as metadata obtained from the asset management system 114. The metadata module 208, for instance, may example coordinates and sizes of the digital content in the layout pane 504, and from this, arrange corresponding portions of the markup language to include these coordinates and sizes. Metadata describing links to and characteristics of the digital content that correspond to these portions may also be imported as part of the metadata 210.

In the illustrated example, the metadata 210 included in the metadata pane 902 includes a link shown as "href", which is an URL path to the asset management system 114, via which, the digital content may be obtained. Custom content management system (CMS) information may also be included, which may be used by the asset management system 114 for replication. In this way, automated generation of the metadata 210 may occur "behind the scenes" by the metadata module 208, which may increase accessibility of these techniques to creative professionals that do not have specialized coding knowledge as well as increase efficiency to creative professionals that do have such knowledge.

Figure 10:
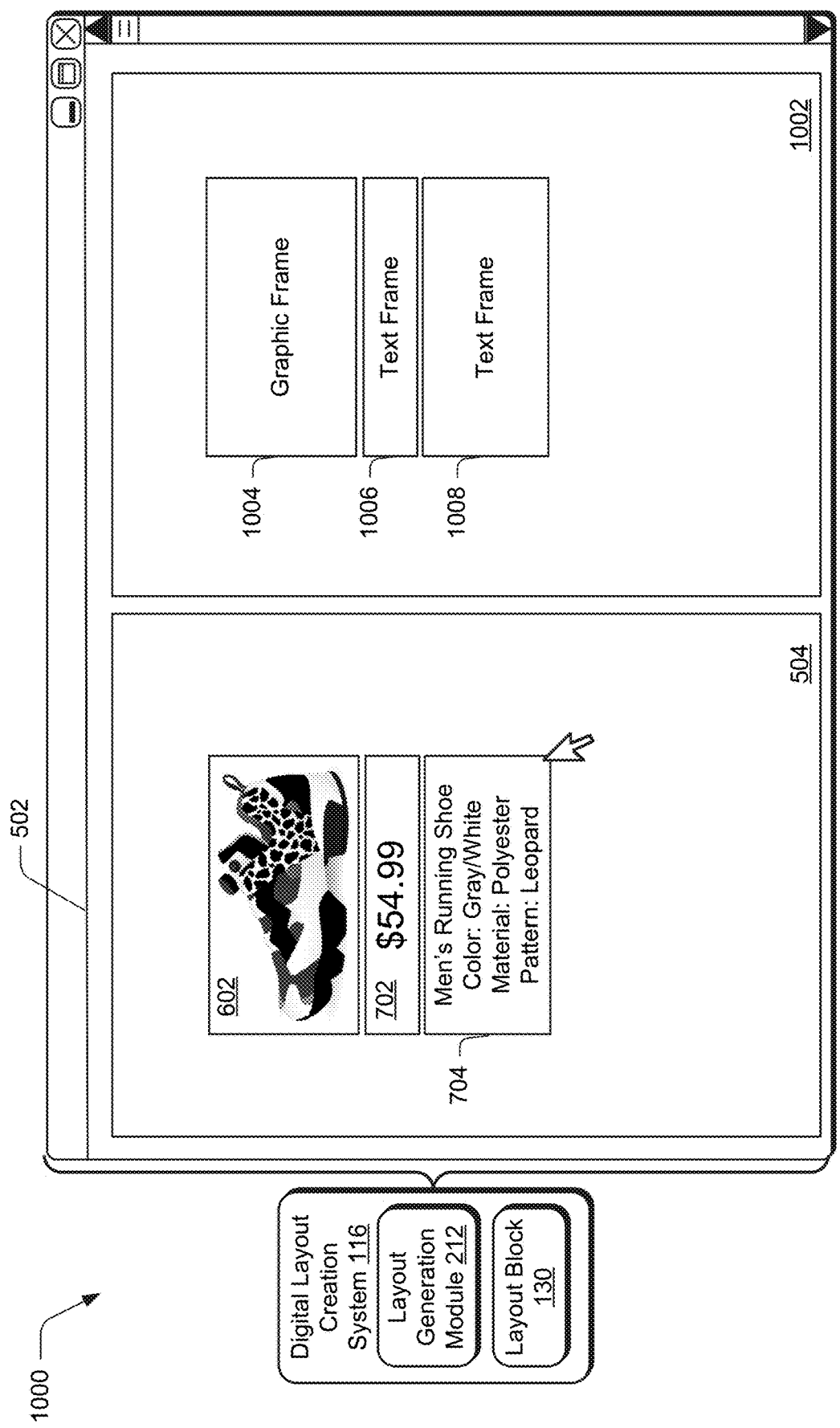
FIG. 10 depicts an example implementation showing frames of the digital content as arranged by the creative professional.

FIG. 10 depicts an example implementation 1000 showing frames of the digital content as arranged by the creative professional. The user interface 502 in this example includes a frame panel 1002 that depicts frames as specified by the digital content 602, 702, 704 arranged in the layout pane 504. The frames 1004, 1006, 1008, for instance, define bounding boxes that are to be filled to generate digital catalog entries in the digital catalog 136 as described in the following section. In this way, a creative professional may interact with rich digital content that provides an accurate look and feel to generate a template as a layout block 130 for generating digital catalog entries, as opposed to the empty boxes of conventional techniques.

Figure 11:
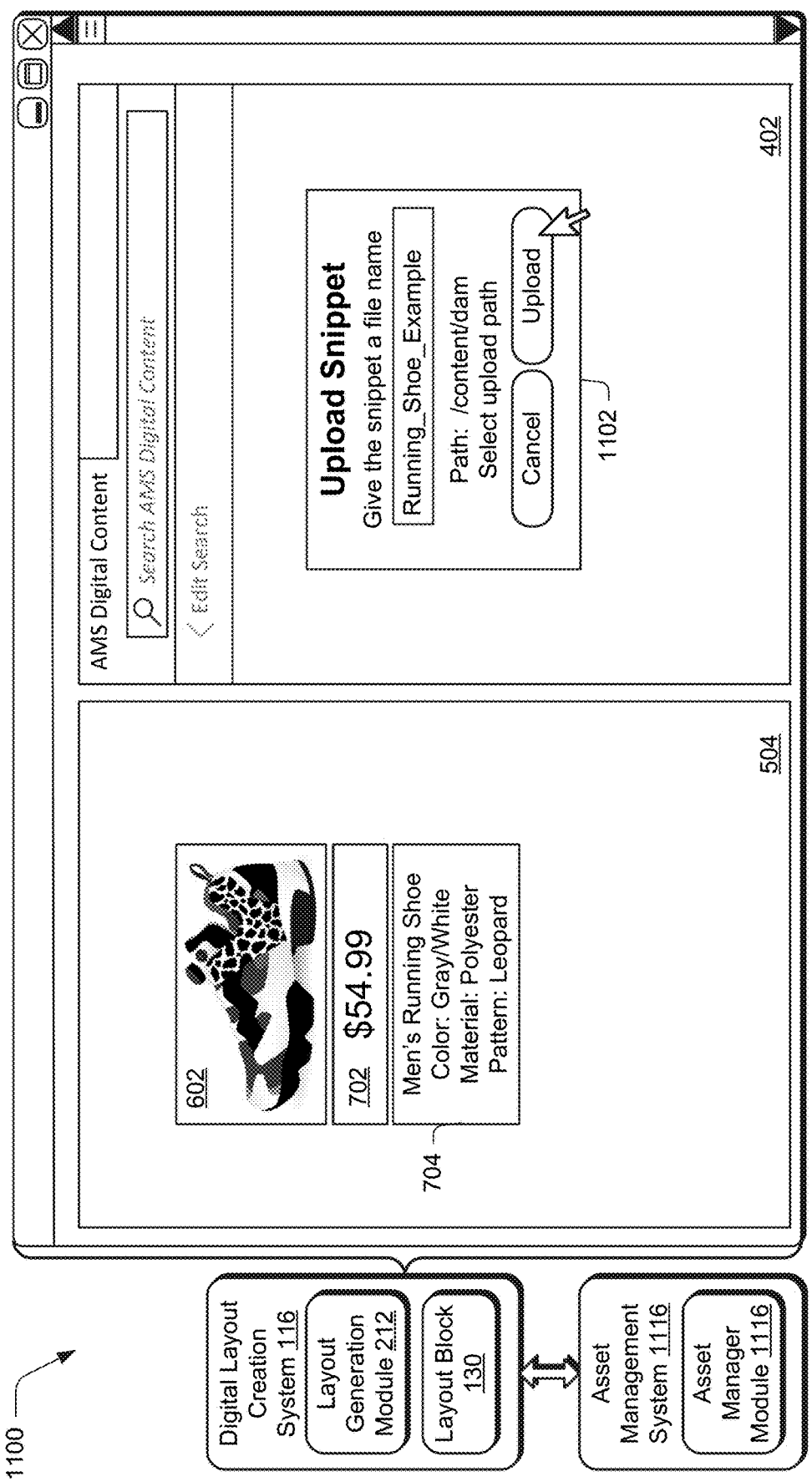
FIG. 11 depicts an example implementation in which metadata, generated based on a layout of digital content in a layout pane, is used to generate a layout block.

FIG. 11 depicts an example implementation in which metadata 210 generated based on a layout of digital content 602, 702, 704 in the layout pane 504 is used to generate a layout block 130. The layout block 130, for instance, may be configured as a "snippet," which is a file format supported by the digital layout creation system 116 which contains objects (e.g., the frames and corresponding digital content 602, 702, 704) and describes a location of the objects relative to each other in a user interface, e.g., the layout pane 504. In an implementation, the layout block 130, as a snippet, does not contain the digital content, itself, but rather is in the form of a markup language (e.g., XML) type of structure containing different element nodes having attributes in terms of key values and a logical hierarchy of content.

An input, for instance, may be received that selects the digital content 602, 702, 704 in the layout pane 504 that is to serve as a basis for generating the layout block 130. An option 1102 is then output that is configured to name the layout block 130 and cause uploading of the layout block 130 to a storage device 132. From this, a layout block 130 is generated that describes the arrangement as a plurality of frames based on the metadata 210 (block 306). A layout generation module 212, for instance, may be configured to utilize a scripting dynamic object model to take the selected items of digital content from objects in the associated metadata 210 to generate the layout block 130 as a snippet for inclusion in a repository in the storage device 132. This layout block 130 may then be selected by the creative professional or other creative professional as a basis to generate a digital catalog entries of a digital catalog 136, an example of which is described in the following section and shown in corresponding figures.

Digital Catalog Creation Using a Layout Block

Figure 12:
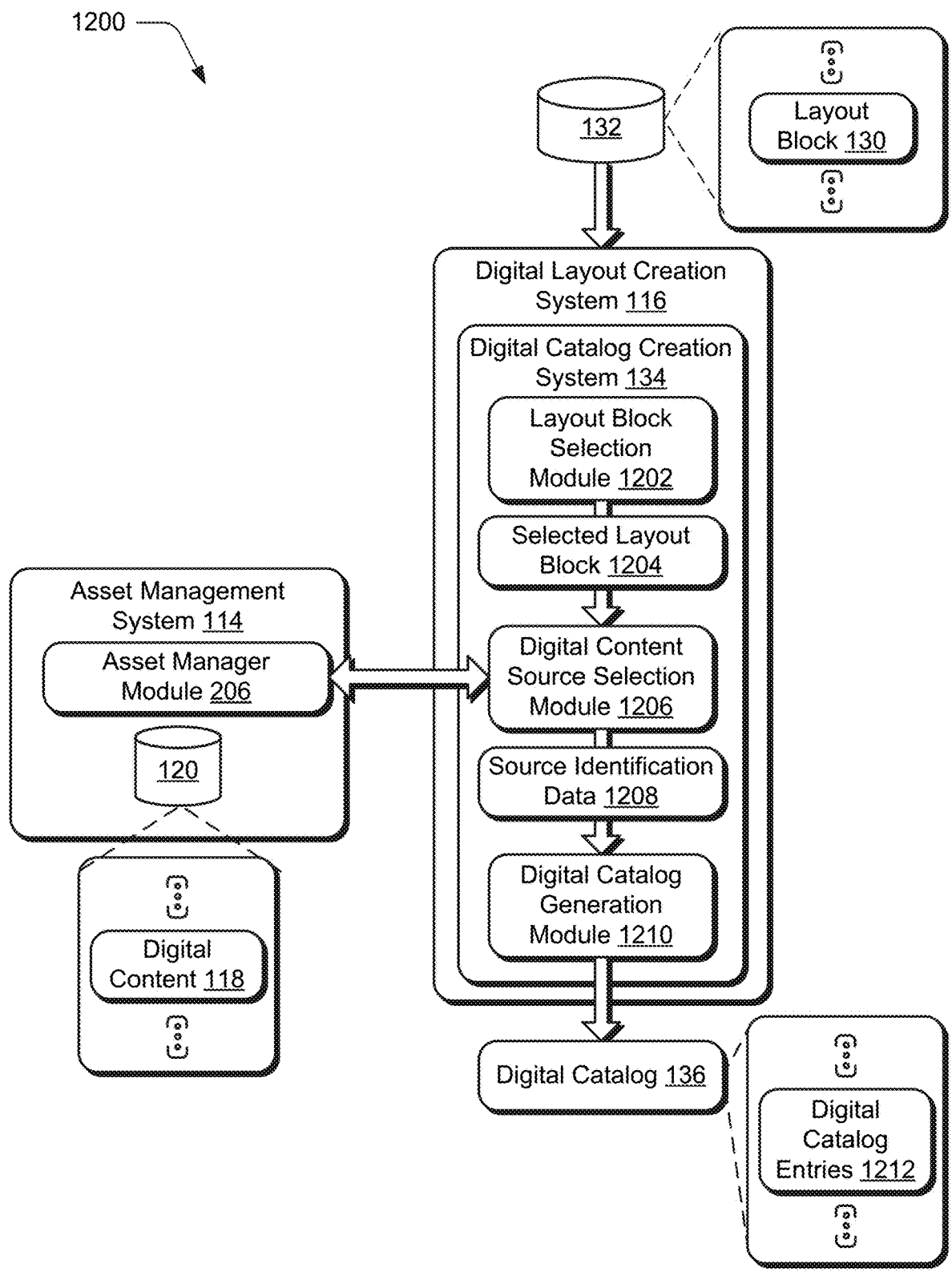
FIG. 12 depicts a system in an example implementation showing operation of a digital catalog creation system of FIG. 1 in greater detail as being used to generate digital catalog entries of a digital catalog automatically and without user intervention using the layout block of FIG. 2.
Figure 13:
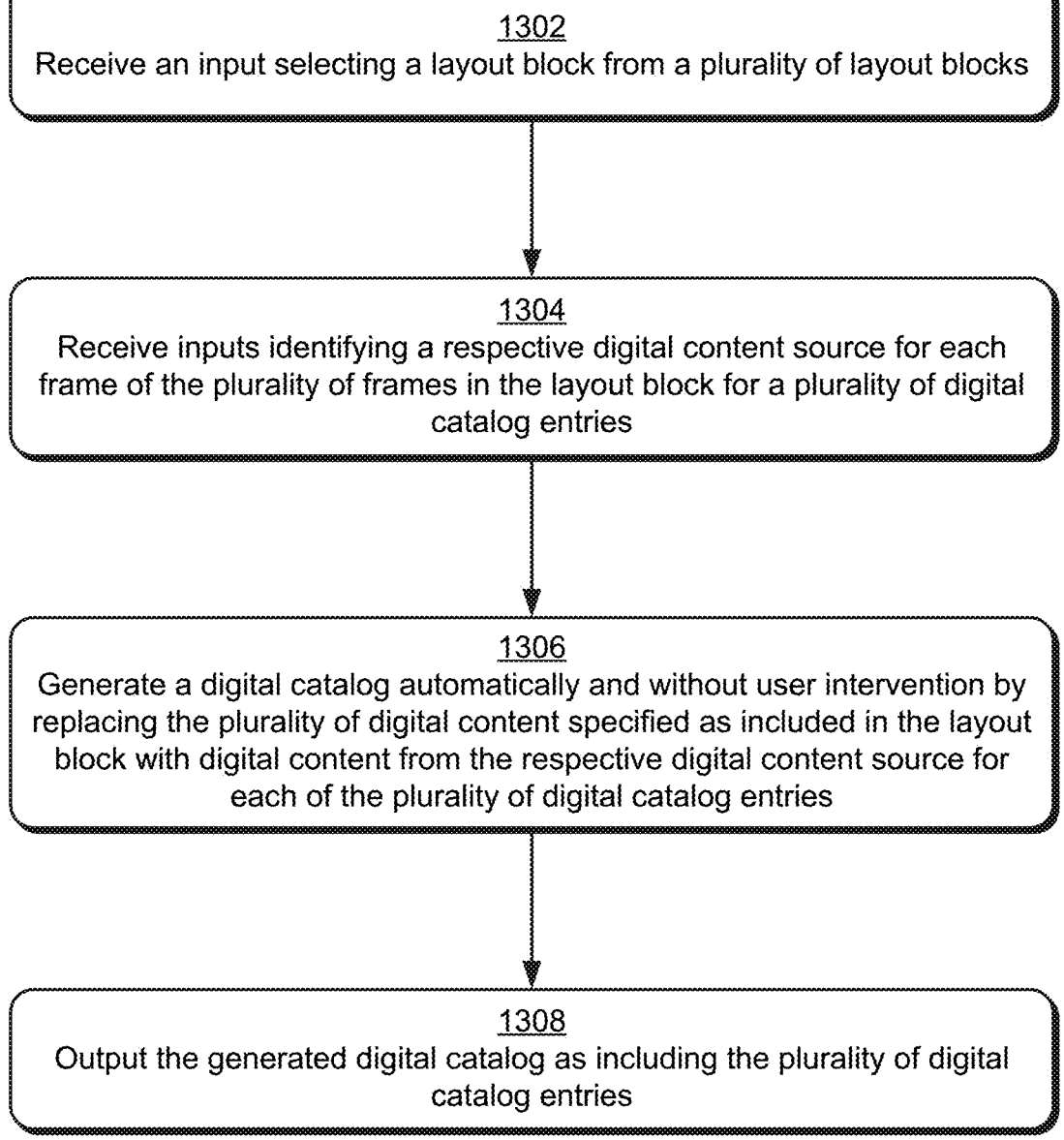
FIG. 13 is a flow diagram depicting a procedure in an example implementation in which a digital catalog having a plurality of digital catalog entries is generated using a layout block.

FIG. 12 depicts a system 1200 in an example implementation showing operation of the digital catalog creation system 134 of FIG. 1 in greater detail as being used to generate digital catalog entries of a digital catalog 136 automatically and without user intervention using the layout block of FIG. 2. FIG. 13 depicts a procedure 1300 in an example implementation in which a digital catalog having a plurality of digital catalog entries is generated using a layout block.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made interchangeably to FIGS. 12 and 13 as well as the user interfaces and systems of FIGS. 14-17.

Figure 14:
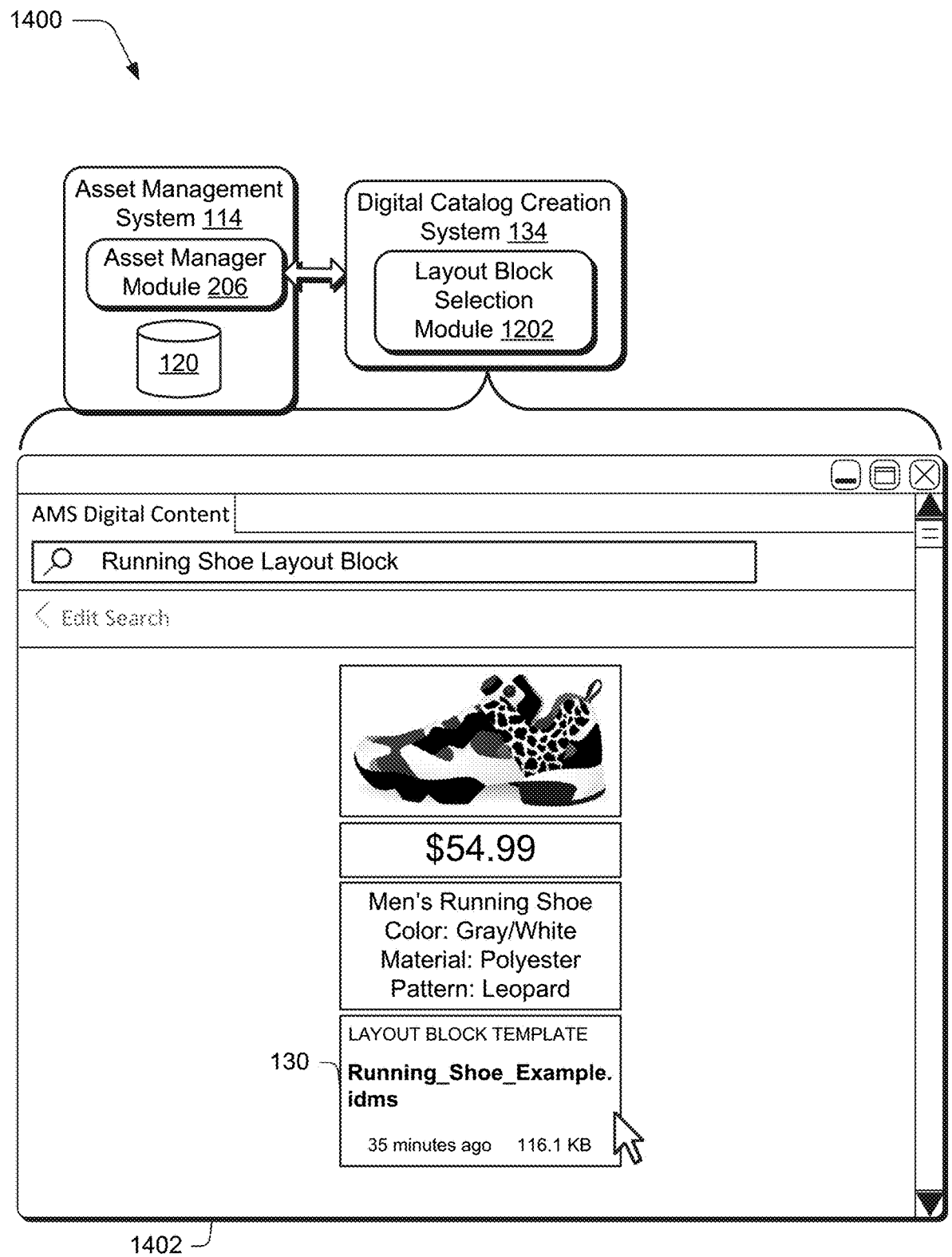
FIG. 14 depicts an example implementation of selection of a layout block for use in generating digital catalog entries of a digital catalog.
Figure 15:
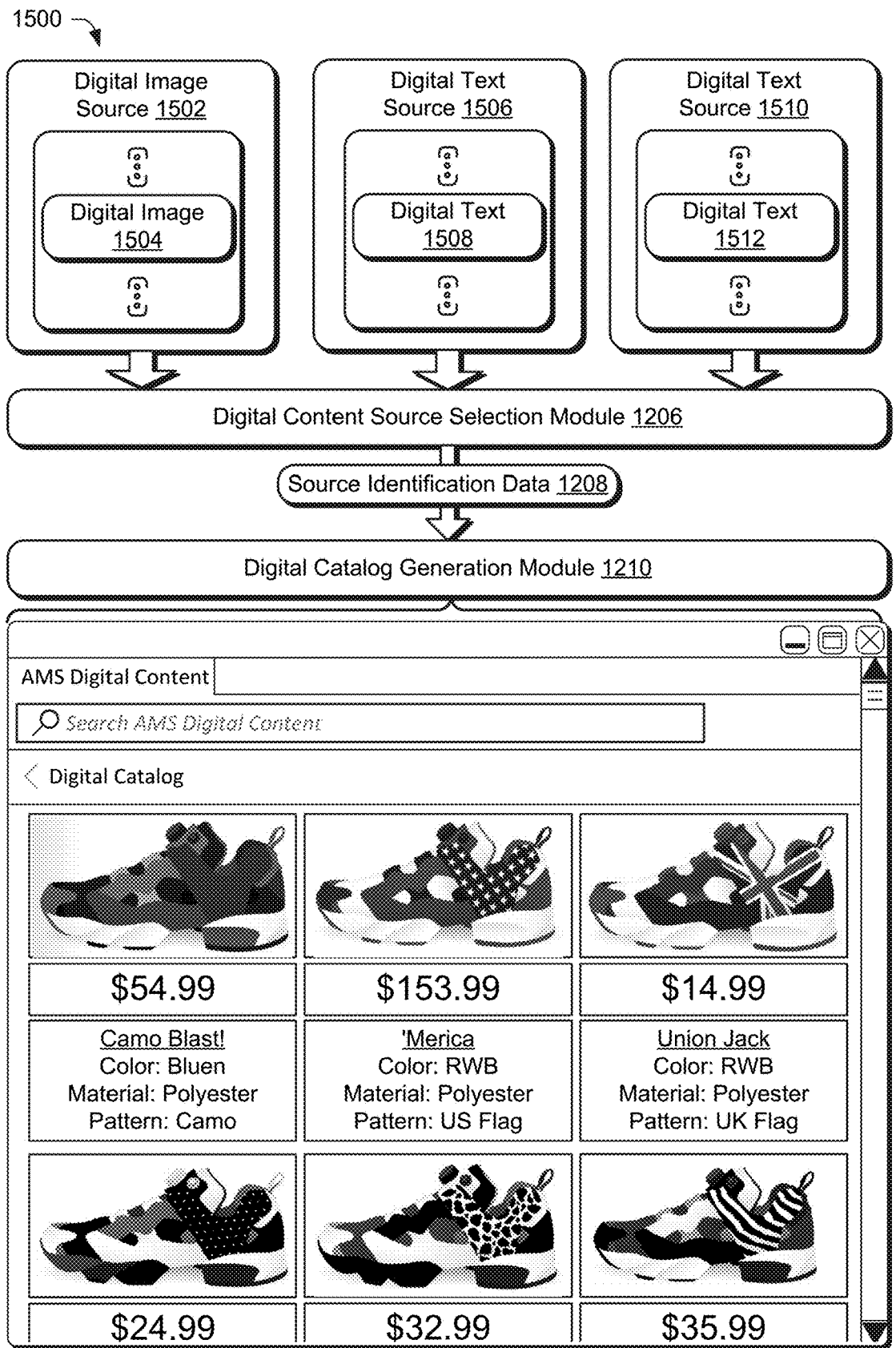
FIG. 15 depicts an example implementation of selection and use of digital content sources in generating the digital catalog entries of the digital catalog.

To begin, an input is received by a layout block selection module 1202 of the digital layout creation system 116 selecting a layout block 1204 from a plurality of layout blocks 130 (block 1302). As shown in FIG. 14, for instance, a user interface 1402 is output by the digital catalog creation system 134. The user interface 1402 accesses the asset management system 114 in a non-modal manner to display representations of layout blocks that are available via a storage device 120. User inputs may then be received via the user interface 1402 (e.g., through use of a cursor control device) to select a layout block 1204 of interest.

Once selected, inputs are then received by a digital content source selection module 1206 identifying a respective digital content source for each frame of the plurality of frames in the selected layout block 1204 for a plurality of digital catalog entries (block 1304). The layout block 1204, for instance, may have a defined order for the frames. Digital content sources may then be selected in an order that matches this defined order to specify which items of digital content are to be disposed in which frames to form the digital catalog entries. In the illustrated example of FIG. 15, for instance, a digital image source 1502 is first selected having a collection of digital images 1504 of running shoes, a digital text source 1506 is then selected having digital text 1508 having a price for those shoes, and a digital text source 1510 having digital text 1512 that describes the shoes. Other examples are also contemplated, such as to drag and drop representations of collections of digital content maintained by the asset management system 114 into respective frames.

The digital catalog generation module 1201 is then employed to generate the digital catalog 136 automatically and without user intervention by replacing the plurality of digital content specified as included in the layout block 1204 with digital content from the respective digital content sources for each of the plurality of digital catalog entries 1212 (block 1306). The generated digital catalog 136 is then output, e.g., in a user interface 1514, as including the plurality of digital catalog entries 1212 (block 1308). The digital catalog generation module 1210, for instance, may receive user inputs specifying which digital catalog entries 1212 are to be included in the digital catalog 136.

Figure 16:
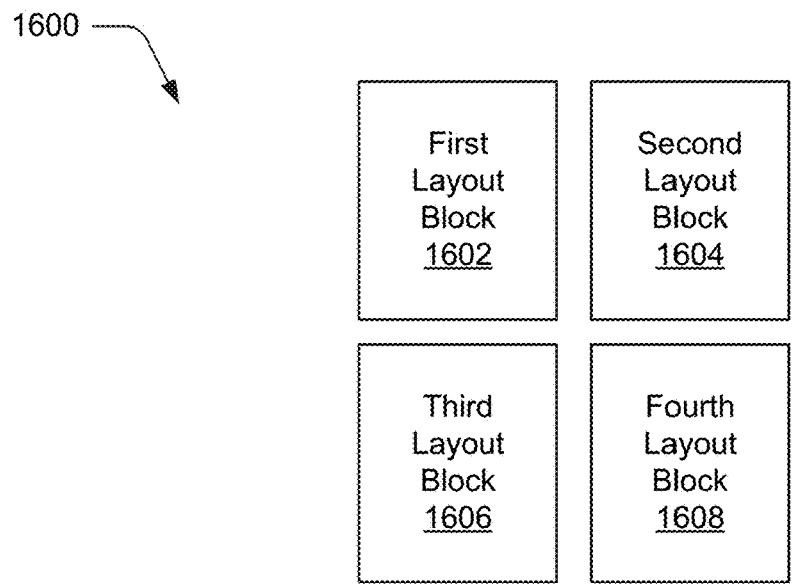
FIGS. 16 and 17 depict examples of digital catalog entry arrangements using layout blocks.
Figure 17:
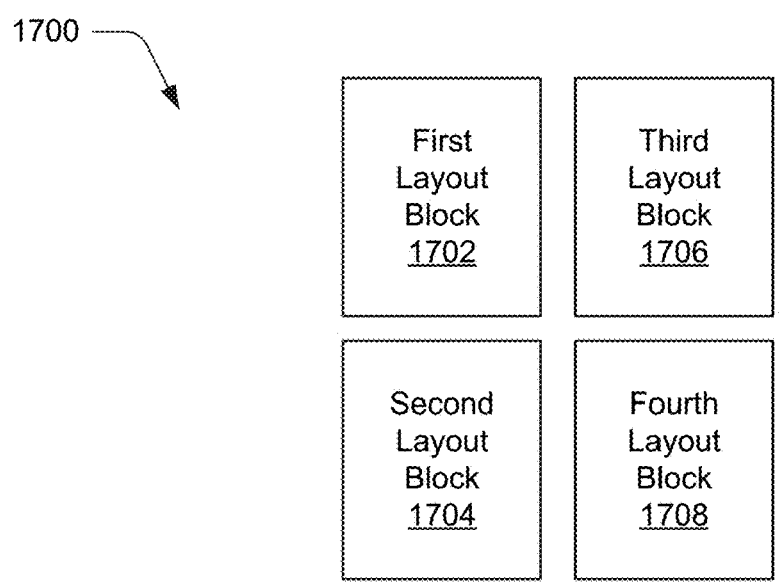

As part of this, inputs may be received to specify an arrangement of the digital catalog entries 1212 on a page with respect to each other. FIG. 16, for instance, depicts an example 1600 of row and then column ordering in which rows are filled first by first and second layout blocks 1602, 1064, followed by a second row of the third and fourth layout blocks 1606, 1608, as following a left to right ordering typically found for Roman users. Other examples are also contemplated, such as a right to left ordering as typically found for Middle Eastern users. FIG. 17 depicts an example 1700 in which a column and then row ordering is followed such that the first and second layout blocks 1702, 704 are arranged top to bottom in a left column, followed by third and fourth layout blocks 1706, 1708 in a right column as typically found with Chinese, Japanese, and Korean users.

The digital catalog generation module 1210, for instance, may begin by examining a page that is to receive the digital catalog entries 1212. If no content is already included on the page, an extreme top/left corer is used within the margins of the page to place a digital catalog entry. If content or a previous digital catalog entry is included, a binary search is performed on the x-coordinates of the page to fine a next probable position. After finding the position, the digital catalog generation module 1210 evaluates whether the digital catalog entry will fit within available space at that position, and if so, the entry is paced on the page. If sufficient space is not found, then a next probable y-coordinate is searched by the digital catalog generation module 1210 using a binary search. Again, placement is evaluated to determine whether sufficient space exists on the page to include the entry. If so, the entry is placed on the page, and if not, a new page is created and this logic is repeated. In this way, multiple digital catalog entries may be placed on a same page, with new pages created as needed, which is not possible using conventional page-based techniques. In this way, the digital layout creation system 116 may generate a digital catalog 136 having hundreds, thousands, and even millions of digital catalog entries 1212, which is also not possible using conventional techniques.

Example System and Device

Figure 18:
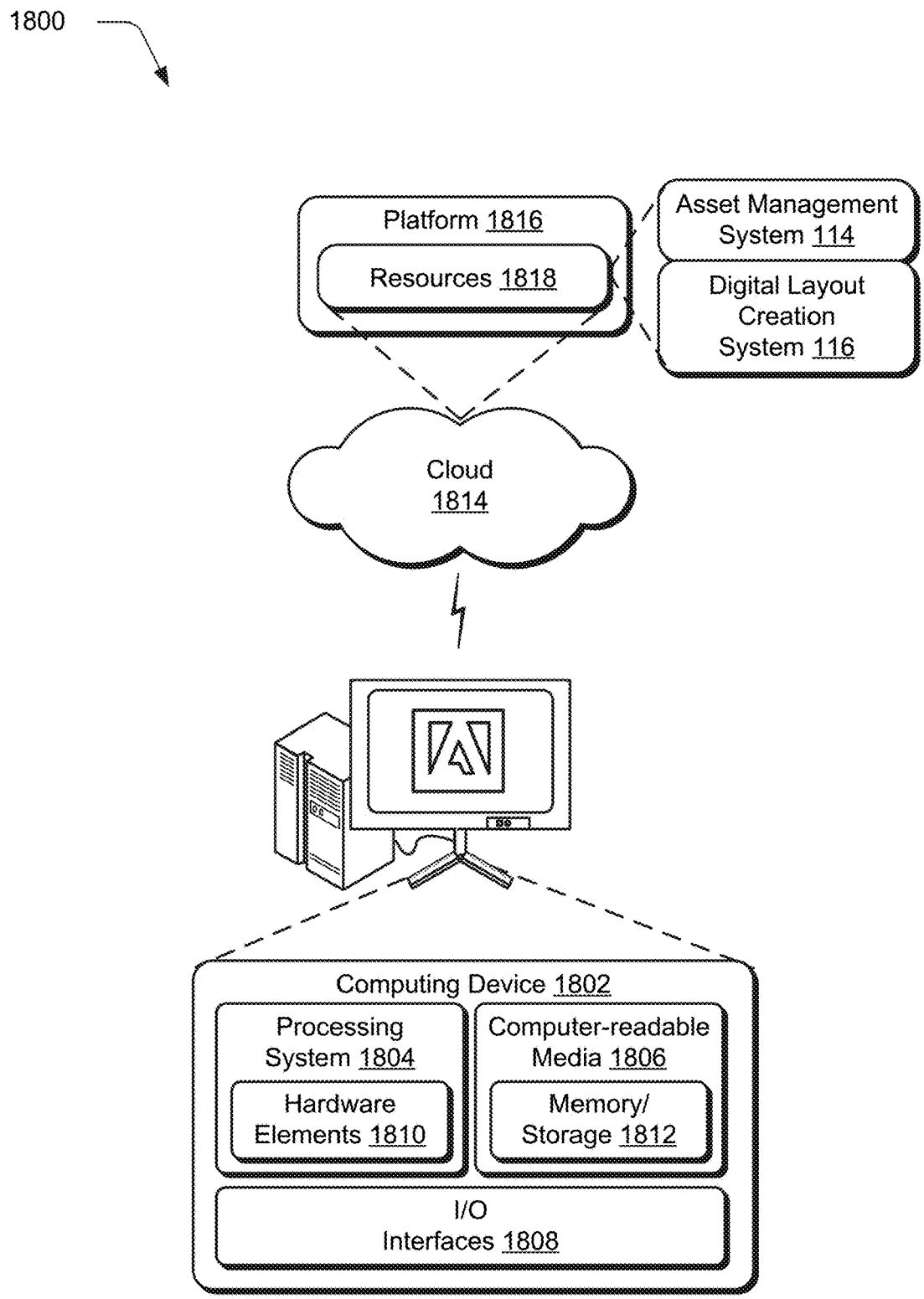
FIG. 18 illustrates an example system including various components of an example device that can be implemented as any type of computing device as described and/or utilize with reference to FIGS. 1-17 to implement embodiments of the techniques described herein.

FIG. 18 illustrates an example system generally at 1800 that includes an example computing device 1802 that is representative of one or more computing systems and/or devices that may implement the various techniques described herein. This is illustrated through inclusion of the asset management system 114 and digital layout creation system 116. The computing device 1802 may be, for example, a server of a service provider, a device associated with a client (e.g., a client device), an on-chip system, and/or any other suitable computing device or computing system.

The example computing device 1802 as illustrated includes a processing system 1804, one or more computer-readable media 1806, and one or more I/O interface 1808 that are communicatively coupled, one to another. Although not shown, the computing device 1802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1804 is representative of functionality to perform one or more operations using hardware. Accordingly, the processing system 1804 is illustrated as including hardware element 1810 that may be configured as processors, functional blocks, and so forth. This may include implementation in hardware as an application specific integrated circuit or other logic device formed using one or more semiconductors. The hardware elements 1810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1806 is illustrated as including memory/storage 1812. The memory/storage 1812 represents memory/storage capacity associated with one or more computer-readable media. The memory/storage component 1812 may include volatile media (such as random access memory (RAM)) and/or nonvolatile media (such as read only memory (ROM), Flash memory, optical disks, magnetic disks, and so forth). The memory/storage component 1812 may include fixed media (e.g., RAM, ROM, a fixed hard drive, and so on) as well as removable media (e.g., Flash memory, a removable hard drive, an optical disc, and so forth). The computer-readable media 1806 may be configured in a variety of other ways as further described below.

Input/output interface(s) 1808 are representative of functionality to allow a user to enter commands and information to computing device 1802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1810 and computer-readable media 1806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1810. The computing device 1802 may be configured to implement particular instructions and/or functions corresponding to the software and/or hardware modules. Accordingly, implementation of a module that is executable by the computing device 1802 as software may be achieved at least partially in hardware, e.g., through use of computer-readable storage media and/or hardware elements 1810 of the processing system 1804. The instructions and/or functions may be executable/operable by one or more articles of manufacture (for example, one or more computing devices 1802 and/or processing systems 1804) to implement techniques, modules, and examples described herein.

The techniques described herein may be supported by various configurations of the computing device 1802 and are not limited to the specific examples of the techniques described herein. This functionality may also be implemented all or in part through use of a distributed system, such as over a "cloud" 1814 via a platform 1816 as described below.

The cloud 1814 includes and/or is representative of a platform 1816 for resources 1818. The platform 1816 abstracts underlying functionality of hardware (e.g., servers) and software resources of the cloud 1814. The resources 1818 may include applications and/or data that can be utilized while computer processing is executed on servers that are remote from the computing device 1802. Resources 1818 can also include services provided over the Internet and/or through a subscriber network, such as a cellular or Wi-Fi network.

The platform 1816 may abstract resources and functions to connect the computing device 1802 with other computing devices. The platform 1816 may also serve to abstract scaling of resources to provide a corresponding level of scale to encountered demand for the resources 1818 that are implemented via the platform 1816. Accordingly, in an interconnected device embodiment, implementation of functionality described herein may be distributed throughout the system 1800. For example, the functionality may be implemented in part on the computing device 1802 as well as via the platform 1816 that abstracts the functionality of the cloud 1814.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital catalog generation environment, a method implemented by at least one computing device, the method comprising:
    receiving, by the at least one computing device, user interaction data describing visual arrangement of a plurality of digital content in relation to each other in a user interface;
    generating, by the at least one computing device, metadata automatically and without user intervention based on the user interaction data, the metadata describing the visual arrangement of the plurality of digital content;
    generating, by the at least one computing device, a layout block that describes the visual arrangement of the plurality of digital content as a plurality of frames containing the plurality of digital content, respectively, within the layout block based on the metadata, the layout block including links to the plurality of digital content;
    receiving, by the at least one computing device, inputs identifying a respective digital content source for each frame of the plurality of frames in the layout block for a plurality of digital catalog entries;
    generating, by the at least one computing device automatically and without user intervention, a digital catalog by replacing the links to the plurality of digital content specified as included in respective said frames within the layout block with links to digital content from the respective digital content source to generate a plurality of digital catalog entries; and
    outputting, by the at least one computing device, the generated digital catalog as including the plurality of digital catalog entries and following the visual arrangement within the layout block.

2. The method as described in claim 1, wherein the generating of the metadata is performed in real time as the user interface data is received.

3. The method as described in claim 2, wherein the metadata is configured as a markup language.

4. The method as described in claim 1, wherein the generating of the digital catalog includes automatic generation of a plurality of pages of the digital catalog using the plurality of digital catalog entries, at least one of the pages having at least two of the plurality of digital catalog entries.

5. The method as described in claim 1, wherein the plurality of digital catalog entries are user selectable to initiate purchase of a respective good or service.

6. The method as described in claim 1, wherein a first frame of the plurality of frames in the layout block includes said digital content as text and a second frame of the plurality of frames includes said digital content as a digital image.

7. The method as described in claim 1, wherein the receiving of inputs identifying the respective digital content source is received in an order following a defined order in the layout block for the plurality of frames to indicate correspondence of the respective digital content source with a respective said frame of the plurality of frames.

8. The method as described in claim 1, wherein:
the layout block includes the links to respective items of the digital content for inclusion in respective frames of the plurality of frames; and
the replacing includes replacing the links with links to the digital content from the respective digital content source.

9. The method as described in claim 1, further comprising selecting the layout block from a plurality of layout blocks in a user interface and wherein the receiving of the inputs is performed using the selected layout block.

10. In a digital catalog generation environment, a system comprising:
a processing system; and
a non-transitory computer-readable storage medium having instructions stored thereon that, responsive to execution by the processing system, causes the processing system to perform operations including:
receiving user interaction data describing visual arrangement of a plurality of digital content in relation to each other in a user interface;
generating metadata automatically and without user intervention based on the user interaction data, the metadata describing the visual arrangement of the plurality of digital content;
generating a layout block that describes the visual arrangement of the plurality of digital content as a plurality of frames containing the plurality of digital content, respectively, within the layout block based on the metadata, the layout block including links to the plurality of digital content;
receiving inputs identifying a respective digital content source for each frame of the plurality of frames in the layout block for a plurality of digital catalog entries;
generating a digital catalog by replacing the links to the plurality of digital content specified as included in respective said frames within the layout block with links to digital content from the respective digital content source to generate a plurality of digital catalog entries; and
outputting the generated digital catalog as including the plurality of digital catalog entries and following the visual arrangement within the layout block.

11. The system as described in claim 10, wherein the generating of the metadata is performed in real time as the user interface data is received.

12. The system as described in claim 11, wherein the metadata is configured as a markup language.

13. The system as described in claim 10, wherein the generating of the digital catalog includes automatic generation of a plurality of pages of the digital catalog using the plurality of digital catalog entries, at least one of the pages having at least two of the plurality of digital catalog entries.

14. The system as described in claim 10, wherein the plurality of digital catalog entries are user selectable to initiate purchase of a respective good or service.

15. The system as described in claim 10, wherein a first frame of the plurality of frames in the layout block includes said digital content as text and a second frame of the plurality of frames includes said digital content as a digital image.

16. The system as described in claim 10, wherein the receiving of inputs identifying the respective digital content source is received in an order following a defined order in the layout block for the plurality of frames to indicate correspondence of the respective digital content source with a respective said frame of the plurality of frames.

17. The system as described in claim 10, wherein:
the layout block includes the links to respective items of the digital content for inclusion in respective frames of the plurality of frames; and
the replacing includes replacing the links with links to the digital content from the respective digital content source.

18. The system as described in claim 10, the operations further comprising selecting the layout block from a plurality of layout blocks in a user interface and wherein the receiving of the inputs is performed using the selected layout block.

19. One or more non-transitory computer-readable storage media having instructions stored thereon that, responsive to execution by a processing system, causes the processing system to perform operations comprising:
receiving user interaction data describing visual arrangement of a plurality of digital content in relation to each other in a user interface;
generating metadata automatically and without user intervention based on the user interaction data, the metadata describing the visual arrangement of the plurality of digital content;
generating a layout block that describes the visual arrangement of the plurality of digital content as a plurality of frames containing the plurality of digital content, respectively, within the layout block based on the metadata, the layout block including links to the plurality of digital content;
receiving inputs identifying a respective digital content source for each frame of the plurality of frames in the layout block for a plurality of digital catalog entries;
generating a digital catalog by replacing the links to the plurality of digital content specified as included in respective said frames within the layout block with links to digital content from the respective digital content source to generate a plurality of digital catalog entries; and
outputting the generated digital catalog as including the plurality of digital catalog entries and following the visual arrangement within the layout block.

* * * * *